May 5, 1925.                                                                1,536,985
R. SWINFORD
CAMERA TRIPOD
Filed Nov. 7, 1923
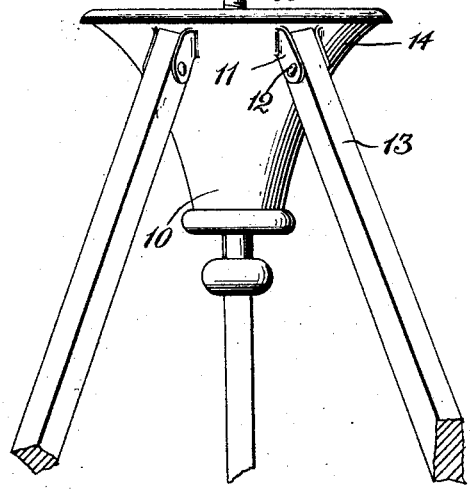
Fig. 1.
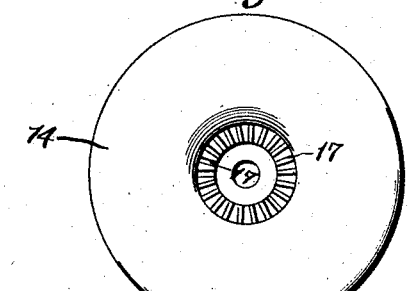
Fig. 2.
Fig. 3.                                   Fig. 4.
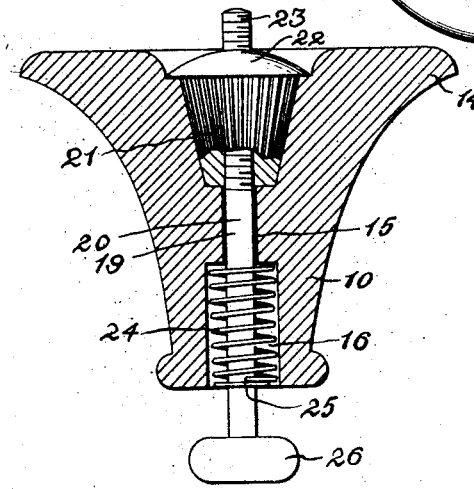    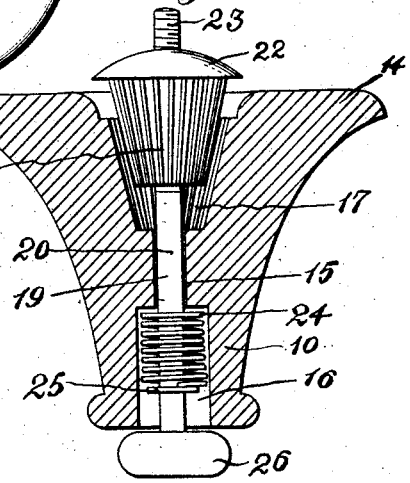
R. Swinford  INVENTOR
BY Victor J. Evans
ATTORNEY
M. J. Trainor
WITNESS Patented May 5, 1925.

1,536,985

UNITED STATES PATENT OFFICE.

RALPH SWINFORD, OF LOS ANGELES, CALIFORNIA.

CAMERA TRIPOD.

Application filed November 7, 1923. Serial No. 673,321.

*To all whom it may concern:*

Be it known that I, RALPH SWINFORD, a citizen of the United States, residing at Los Angeles, in the county of Los Angeles and State of California, have invented new and useful Improvements in Camera Tripods, of which the following is a specification.

This invention relates to tripods for use by amateur or professional photographers and has for its object the provision of a tripod of such construction that the camera or kodak mounted thereon may be instantaneously shifted so as to point in any desired direction without it being necessary to change the location of the tripod itself.

An important and more specific object is the provision of a tripod in which the head carries a longitudinally movable camera holding member provided with means whereby it will be firmly held at any desired rotatably adjusted position, the holding means being released by moving the member longitudinally.

An additional object is the provision of a device of this character which will be simple and inexpensive in manufacture, highly efficient in use, durable in service and a general improvement in the art.

With the above and other objects and advantages in view the invention consists in the details of construction to be hereinafter more fully described and claimed and illustrated in the accompanying drawings, in which:

Figure 1 is a side elevation of a tripod embodying my invention,

Figure 2 is a plan view of the head,

Figure 3 is a longitudinal section through the head on a much larger scale showing the parts in immovable position and Figure 4 is a similar view showing the camera holding member in its released position.

Referring more particularly to the drawings I have shown the tripod as comprising a head 10 which may be substantially circular or of any other preferred shape, and which is provided with pairs of spaced ears 11 between which are pivoted at 12 the legs 13. At its underside the head 10 is formed with a substantially conical enlargement 14 formed with a longitudinal bore 15 at its intermediate portion communicating with a counterbore 16 at its lower end and a frusto-conical chamber 17 at its upper end. The wall of the chamber 17 is toothed or formed with corrugations 18. Longitudinally slidably mounted through the head is a species of bolt designated broadly by the numeral 19 which includes an intermediate or shank portion 20 which fits within the bore 15 and which further includes a frusto-conical head 21 having a toothed or corrugated periphery adapted to fit conformingly within the toothed chamber 17. Above this head 21 the bolt is formed with a disk like enlargement 22 constituting a stop and the upper end of the bolt terminates in a threaded extension 23 adapted to be screwed into the threaded socket always provided in a kodak or camera for tripod mounting.

For holding the bolt normally immovable I provide a spring 24 which fits within the counterbore 16 and which engages against a stop collar 25 on the bolt. The lower end of the bolt is equipped with a knob 26 whereby it may be moved as may be necessary.

In use the bolt has its extension 23 screwed into the camera socket, and the spring 24 holds the bolt at its lowermost position with the enlargement 22 engaging the head 10 for limiting the movement. Owing to the fact that the teeth or corrugations on the head 21 interfit with those in the chamber 17 it is apparent that the bolt cannot rotate. When it is desired to change the position of the camera so that it will point in a different direction, it is merely necessary that the operator press upwardly on the knob 26 which will result in moving the bolt 19 upwardly so that the toothed head 21 will be disengaged from the teeth in the chamber 17. The camera may then be turned to the desired extent, after which release of pressure on the knob will permit the spring 24 to operate to return the bolt to its initial or locked position.

From the foregoing description and a study of the drawings it will be apparent that I have thus provided a simply constructed, easily installed and readily operated tripod structure by means of which a camera may be rigidly supported while being capable of being swung to the desired position at an instant's notice. Owing to the fewness of the parts it is obvious that there is very little to get out of order so that the device should have a long life.

While I have shown and described the preferred embodiment of my invention it is of course to be understood that I reserve the right to make such changes in the form, construction and arrangement of parts as will not depart from the spirit of the invention or the scope of the subjoined claims.

Having thus described my invention I claim:

1. A camera supporting tripod comprising a body formed with a bore and chambers at the ends of the bore, legs connected with the body, a stem slidable through the bore and terminating in a threaded extension adapted to engage within a socket in a camera, a spring located within the lower chamber and connected with the stem for normally urging the same downwardly, and a clutching head on the stem fitting within the upper chamber; the upper chamber being frusto-conical and toothed, said head being correspondingly shaped and having a toothed periphery.

2. A camera supporting tripod comprising a body formed with a bore and chambers at the ends of the bore, legs connected with the body, a stem slidable through the bore and terminating in a threaded extension adapted to engage within a socket in a camera, a spring located within the lower chamber and connected with the stem for normally urging the same downwardly, and a clutching head on the stem fitting within the upper chamber; the upper chamber being frusto-conical and toothed, said head being correspondingly shaped and having a toothed periphery; a counter sink at the top of the upper chamber, and an outstanding flange at the upper end of said head fitting closely in said counter sink.

In testimony whereof I affix my signature.

RALPH SWINFORD.